Patented Feb. 1, 1949

2,460,796

UNITED STATES PATENT OFFICE 2,460,796

PROCESS FOR PREPARING CAROTENOID CONCENTRATES FROM PALM OIL

Eddy W. Eckey, Wyoming, Ohio, assignor to The Procter and Gamble Company, Cincinnati, Ohio, a corporation of Ohio No Drawing. Application May 4, 1942,
Serial No. 441,714

5 Claims. (Cl. 260—410.9)

This invention relates to the preparation of a carotenoid concentrate from palm oil, the primary object being to provide an economical process for recovering such materials in concentrated form.

A further object is to separate the carotenoid pigment substantially completely from the fatty constituent of palm oil, thereby providing a light colored fatty constituent which can be converted easily and readily into a white soap.

Numerous attempts have been made to recover carotenoid pigments from oils and fats but the processes heretofore proposed are costly and usually involve the use of complicated and unusual apparatus requiring technically trained men for operation.

I have developed a method whereby the carotenoids contained in palm oil can be concentrated economically and without the necessity of complicated or unusual apparatus, and with the added advantage that the fatty constituent of the palm oil is separated in a form easily and readily convertible into a white soap. The palm oil employed in the practice of my invention is, of course, preferably one which has not been subjected to any previous processing step which would destroy carotenoid pigment, such as a bleaching operation or high temperature.

Briefly, my method involves the treatment of palm oil, consisting mainly of relatively non-volatile fatty acid esters of glycerin, with a low molecular weight aliphatic monohydric alcohol in the presence of an alkaline alcoholysis catalyst to form volatile esters of the fatty acid constituents and the subsequent separation of alcohol esters from the relatively non-volatile carotenoid pigments, by distillation, the process being characterized by the use of temperatures during all steps of operation sufficiently low to avoid the destruction of valuable carotenoid constituents.

Destruction of carotenoid pigment is not a function of temperature alone but of time and temperature and therefore it is impossible to give a fixed temperature limit below which no pigment is destroyed and above which substantially all is destroyed. However, in general, temperatures below 130° C. are safe even for extended periods of time such as 15 to 20 hours, temperatures in the neighborhood of 140° C. are not detrimental under normal conditions of operation where the total time of processing is under 10 hours, and temperatures as high as 150° C. may be sustained for short periods of time such as two hours or so without serious decomposition of the carotenoid pigment.

The process will be more clearly understood from the following detailed description.

The first step of the process involves alcoholysis of a palm oil, which normally contains an appreciable proportion of carotenoid pigments. The alcohol employed for this reaction is an aliphatic monohydric alcohol, such as methyl or ethyl alcohol, having less than five carbon atoms, which will convert the palm oil glycerides into esters which can be volatilized at a temperature below that at which the carotenoid pigments will be destroyed as described above. In order to facilitate the alcoholysis reaction and thereby effect substantially complete conversion from glycerin ester to a lower alcohol ester in a relatively short time without the use of temperatures harmful to the carotenoid pigment, an alkaline alcoholysis catalyst such as sodium hydroxide, potassium hydroxide, or a preformed alkali metal methoxide or ethoxide is preferably employed. Known acid alcoholysis catalysts such as sulfuric or hydrochloric acids are harmful to the carotenoid pigment and are to be avoided.

Whether or not the palm oil is alkali refined to remove free fatty acids prior to alcoholysis is optional. If the oil has been subjected to a refining process such as alkali refining, washing with alcohol or other process wherein the free fatty acid content is reduced to a minimum while retaining a substantial amount of carotenoid pigment, then alcohol and catalyst may be added directly and the mixture heated and boiled under a reflux condenser until the desired ester interchange has been completed.

However, if the palm oil contains an appreciable amount of free fatty acid as in the case of crude palm oil and if for some reason it is impracticable to subject the oil to a separate processing step wherein the free fatty acids are removed, then it is advisable to use in alcoholysis sufficient alkaline catalyst not only to serve as catalyst but also to neutralize the free fatty acids. Other methods of rendering the free fatty acids inactive toward the catalyst such as by esterification with alcohol under suitable conditions prior to the addition of the catalyst may be practiced without departing from the spirit of my invention provided of course the said methods do not destroy the carotenoid pigment in the palm oil.

The alcoholized reaction mixture comprises the acyl esters of the monohydric alcohol, excess alcohol, carotenoid pigment and catalyst in solution, and liberated glycerin. Under some conditions of operation, such as in the use of only a moderate excess of methyl alcohol in alcoholysis, the liberated glycerin will exist for the most part as a separate phase. Under other conditions of operation, for example those involving the use of high molecular weight monohydric alcohols such as propyl or isopropyl alcohol, and a large excess which will act as a mutual solvent, all constituents of the alcoholysis reaction mixture, including the glycerin, may be mutually soluble and exist as a single phase. In either case the reaction mixture may be subjected to distillation directly in order to effect concentration of the carotenoid pigment, or it may be subjected to treatment whereby the glycerin is separated prior to distillation. The latter treatment is preferred, although it is not essential in accomplishing the objects of the invention.

When it is desired to separate the glycerin prior to distillation, and in the event the reaction mixture exists as a single phase with glycerin in solution, removal of this substance may be effected by water washing. If, however, glycerin exists as a separate phase, most of it may be removed by decantation and any residual glycerin, together with other water soluble substances, may thereafter be separated by washing with water.

In connection with the water washing procedure, it should be noted that the alkaline catalyst may interfere with successful operation. For example, sodium methoxide will decompose in the presence of water to form methyl alcohol and sodium hydroxide. The latter compound will of course react with the palm oil fatty acid esters to form soap which may develop emulsion difficulties interfering with clean separation of the aqueous phase. Accordingly, to prevent this action I find it preferable to render the catalyst inactive and this is most easily accomplished by the addition of an equimolar quantity of an acid reacting compound such as phosphoric acid. An alternative way of inactivating the catalyst and of simultaneously removing glycerin is to wash the mixture with aqueous alcohol. Soaps resulting from the decomposition of the catalyst are thus removed and do not interfere with subsequent water washing.

If there is no objection to the presence of liberated glycerine during concentration of the carotenoid pigment by distillation of the more volatile substances, then separation of same either by decantation or by water washing may be omitted. However, before such a mixture is treated to effect such concentration, it is preferable to neutralize or otherwise render inactive the alcoholysis catalyst contained therein so as to prevent reversal of the alcoholysis reaction and the reformation of the glycerides during the distillation step.

After the alcoholysis reaction mixture has been prepared for concentration either by removal of glycerin and inactivation of catalyst or by inactivation of catalyst alone, it is then subjected to distillation conditions as more fully hereinafter explained, whereby the acyl esters and other materials volatilizable under the distillation conditions, including glycerin if present, are removed and subsequently fractionated if desired and the non-volatile carotenoid pigment is recovered in concentrated form in the distillation residue. The distilled monohydric alcohol esters are almost water-white and may be employed directly in the manufacture of white soap, for example, the alcohol being recovered for reuse if desired.

By observing the temperature restrictions hereinbefore referred to, substantially all of the original carotenoid pigment is recovered and practically none is lost by destruction due to excessively high temperatures or prolonged heating. In order that the distillation step may be conducted at temperatures within the limits set above, and in order that the monohydric alcohol ester of the fatty acid may be distilled substantially completely under these limiting temperature conditions, vacuum distillation is necessary and the use of steam or other inert gas to aid in the distillation may or may not be employed as desired.

The choice of suitable vacuum conditions and the selection of suitable equipment is well within the scope of those skilled in the art. Elaborate or unusual apparatus is distinctly not necessary. Any conventional type of still which is adequate for conducting simple vacuum distillations in the pressure range of 0.02 to 0.5 mm. of mercury will be suitable.

The following example is illustrative of the manner in which my invention may be practiced. All parts are by weight.

*Example.*—To 500 parts of anhydrous methanol is added 5.0 parts of sodium hydroxide pellets. After the sodium hydroxide is dissolved 1500 parts alkali-refined palm oil containing an appreciable amount of carotenoid pigment is added and the mixture heated under a reflux condenser for one hour at 70° C.

The mixture is allowed to cool and settle. The lower layer, consisting predominantly of the liberated glycerin, is decanted and the upper layer of methyl esters of the palm oil fatty acids containing the carotenoid pigment in solution is washed first with a 50:50 mixture of alcohol and water and then with water alone. The washed material is then dried by warming under vacuum with a stream of nitrogen bubbling through the liquid.

The washed and dried solution of methyl esters is then conveyed to a simple distilling vessel provided with a vapor outlet sufficiently large to avoid material back pressure in the vessel and with some loosely coiled aluminum wire in the vapor space to provide some rectification of the distillate.

The distillate receiver of the distilling apparatus is connected to a conventional oil sealed rotary vacuum pump and the pressure on the system is reduced to about 0.04 mm. mercury pressure. The temperature of the contents of the vessel is gradually raised by means of a suitable oil bath and distillation of most of the volatile esters takes place below 135° C. In order to remove higher boiling esters, the bath temperature is thereafter raised to 140° C. for about one-half hour, the whole period of distillation taking about five hours.

Several concentrates have been prepared in accordance with my invention and I have found that it is possible to concentrate the desired carotenoid pigment in a residue amounting to two to two and a half per cent of the total fat used without measurable loss of the carotenoid pigment. Furthermore, examination of the concentrates prepared in accordance with my invention has shown that no alteration of the nature of the pigment is effected when the concentrates are formed in accordance with the instant process.

The carotenoid concentrates have pro-vitamin A activity and are suitable for use in the preparation of pro-vitamin A pills and prepared stock feeds. In addition, these concentrates may be employed in the manufacture of margarine as a source of coloring matter which, in addition, supplies the product with pro-vitamin A activity.

In all cases the distillate which consists of the alcohol esters of the palm oil fatty acids is very light in color and if desired it may be converted into white soap in accordance with known processes without difficulty. By the employment of a small rectifying column in the distillation step, it is possible to obtain an almost water-white fatty acid product at a cost substantially less than that incurred by the distillation of the fatty acids per se, this lower cost being made possible by the recovery of the carotenoid pigment which possesses an appreciable value.

Having thus described my invention, what I claim and desire to secure by Letters Patent is:

1. A process of recovering from palm oil unsaponifiable carotenoid pigment concentrate substantially free of saponifiable fatty esters, and of simultaneously producing fatty esters substantially free of unsaponifiable carotenoid pigment and suitable for use in the manufacture of white soap, comprising reacting palm oil with an aliphatic monohydric alcohol having less than five carbon atoms in the presence of catalytic amounts of an alkaline alcoholysis catalyst to form monohydric alcohol esters of the fatty acids of the palm oil, which esters contain carotenoid pigment in solution, inactivating the catalyst, boiling the fatty ester solution of the carotenoid pigment, separating entrained carotenoid pigment from the vapors and refluxing the separated entrainment, and substantially completely distilling off the volatile fatty acid esters thereby separating the product subjected to distillation into a substantially carotenoid-pigment-free fatty acid ester distillate suitable for use in the production of white soap and a substantially fatty-ester-free residue of concentrated carotenoid pigment, the total time of treatment during boiling varying inversely with the temperature substantially in accordance with the schedule at temperatures below 130° C., not longer than 15 to 20 hours, at 140° C., not longer than ten hours, at 150° C., not longer than two hours.

2. A process of recovering from unbleached palm oil unsaponifiable carotenoid pigment concentrate susbtantially free of saponifiable fatty esters, and of simultaneously producing saponifiable fatty esters, substantially free of unsaponifiable carotenoid pigment and suitable for use in the manufacture of white soap, comprising reacting unbleached palm oil with an aliphatic monohydric alcohol having less than five carbon atoms in the presence of catalytic amounts of an alkaline alcoholysis catalyst to form monohydric alcohol esters of free and combined fatty acids of the palm oil, which esters contain carotenoid pigment in solution, inactivating the catalyst, boiling the fatty ester solution of the carotenoid pigment at a pressure of about 0.02 to 0.5 mm. of mercury, separating entrained carotenoid pigment from the vapors and refluxing the separated entrainment, and substantially completely distilling off the volatile fatty acid esters thereby separating the product subjected to distillation into a substantially carotenoid-pigment-free fatty acid ester distillate suitable for use in the production of white soap, and a substantially fatty-ester-free residue of concentrated carotenoid pigment, the temperature during all steps of the process being not substantially higher than 140° C. and the total time of processing at temperatures in the neighborhood of 140° C. being less than ten hours.

3. A process of recovering from unbleached palm oil unsaponifiable carotenoid pigment concentrate substantially free of saponifiable fatty esters, and of simultaneously producing saponifiable fatty esters substantially free of unsaponifiable carotenoid pigment and suitable for use in the manufacture of white soap, comprising reacting unbleached palm oil with methanol in the presence of catalytic amounts of an alkali metal methoxide to form methyl esters of free and combined fatty acids of the palm oil, which esters contain carotenoid pigment in solution, washing the product of the reaction with water to inactivate the alkali metal methoxide and separate liberated glycerol, boiling the methyl ester solution of the carotenoid pigment at a pressure from about 0.02 to about 0.5 mm. of mercury, separating entrained carotenoid pigment from the vapors and refluxing the separated entrainment, and substantially completely distilling off the methyl esters thereby separating the product subjected to distillation into a substantially carotenoid-pigment-free methyl ester distillate suitable for use in the production of white soap, and a substantially methyl-ester-free residue of concentrated carotenoid pigment, the temperature during all steps of the process being not substantially higher than 140° C. and the total time of processing at temperatures in the neighborhood of 140° C. being less than ten hours.

4. A process of recovering from unbleached palm oil unsaponifiable carotenoid pigment concentrate substantially free of saponifiable fatty esters, and of simultaneously producing saponifiable fatty esters substantially free of unsaponifiable carotenoid pigment and suitable for use in the manufacture of white soap, comprising reacting unbleached palm oil with methanol in the presence of catalytic amounts of an alkali metal methoxide to form methyl esters of free and combined fatty acids of the palm oil, which esters contain carotenoid pigment in solution, neutralizing the alkali metal methoxide with an acid reacting compound, separating the methyl esters from liberated glycerol, washing the said esters to remove residual impurities, boiling the methyl ester solution of the carotenoid pigment at a pressure from about 0.02 to about 0.5 mm. of mercury, separating entrained carotenoid pigment from the vapors and refluxing the separated entrainment, and substantially completely distilling off the methyl esters thereby separating the product subjected to distillation into a substantially carotenoid-pigment-free methyl ester distillate suitable for use in the production of white soap, and a substantially methyl-ester-free residue of concentrated carotenoid pigment, the temperature during all steps of the process being not substantially higher than 140° C. and the total time of processing at temperatures in the neighborhood of 140° C. being less than ten hours.

5. A process of recovering from palm oil unsaponifiable carotenoid pigment concentrate substantially free of saponifiable fatty esters, and of simultaneously producing fatty esters substantially free of unsaponifiable carotenoid pigment and suitable for use in the manufacture of white soap, comprising reacting palm oil with methanol in the presence of catalytic amounts of an alkali metal methoxide to form methyl esters of free and combined fatty acids of the palm oil, which esters contain carotenoid pigment in solution, washing the product of the reaction with water to inactivate the alkali metal methoxide and separate liberated glycerol, boiling the methyl ester solution of the carotenoid pigment at a pressure of about 0.04 mm. of mercury, and distilling off most of the lower boiling methyl esters within a period of about four and one-half hours, at a temperature below about 135° C., separating entrained carotenoid pigment from the methyl ester vapors during distillation and refluxing the separated entrainment, thereafter raising the temperature of the residue to about 140° C. for about one-half hour and distilling off higher boiling esters, whereby to obtain a residue of concentrated carotenoid pigment substantially free of methyl esters.

EDDY W. ECKEY.

REFERENCES CITED

The following references are of record in the file of this patent:

UNITED STATES PATENTS

| Number | Name | Date |
|---|---|---|
| 2,170,872 | Peebles | Aug. 29, 1939 |
| 2,263,550 | Andrews | Nov. 18, 1941 |
| 2,293,551 | Kuntz | Aug. 18, 1942 |

OTHER REFERENCES

Karrer, Organic Chemistry, Nordemann Publ. Co., New York, 1938, page 76.

Sherman & Smith, The Vitamins, 2nd Edition, Chem. Catalog Co., 1931, pages 232–233.

Groggins, "Unit Processes in Organic Synthesis," McGraw-Hill, New York, 2nd edition, pages 560–561.